United States Patent
Walsh

(10) Patent No.: US 10,579,700 B2
(45) Date of Patent: Mar. 3, 2020

(54) WEBSITE BUILDER IMAGE AND COLOR PALETTE SELECTOR

(71) Applicant: DreamHost, LLC, Los Angeles, CA (US)

(72) Inventor: Ian D. Walsh, Fullerton, CA (US)

(73) Assignee: DreamHost, LLC, Los Angeles, CA (US)

(*) Notice: Subject to any disclaimer, the term of this patent is extended or adjusted under 35 U.S.C. 154(b) by 268 days.

(21) Appl. No.: 15/799,665

(22) Filed: Oct. 31, 2017

(65) Prior Publication Data

US 2019/0130606 A1    May 2, 2019

(51) Int. Cl.
| | |
|---|---|
| *G06F 16/958* | (2019.01) |
| *G06T 7/90* | (2017.01) |
| *G06F 3/0484* | (2013.01) |
| *G06F 3/0482* | (2013.01) |
| *G06T 11/00* | (2006.01) |

(Continued)

(52) U.S. Cl.
CPC .......... *G06F 16/958* (2019.01); *G06F 3/0482* (2013.01); *G06F 3/04845* (2013.01); *G06F 16/5838* (2019.01); *G06K 9/4652* (2013.01); *G06T 7/90* (2017.01); *G06T 11/001* (2013.01); *G06T 2207/10024* (2013.01)

(58) Field of Classification Search
CPC .. G06F 3/0482; G06F 3/04845; G06F 16/958; G06F 8/34; G06F 16/5838; G06F 8/20; G06T 7/90; G06K 9/4652
See application file for complete search history.

(56) References Cited

U.S. PATENT DOCUMENTS

| | | | |
|---|---|---|---|
| 9,563,973 B2 * | 2/2017 | Manuja | G06T 11/001 |
| 2009/0157609 A1 * | 6/2009 | Phan | G06F 16/972 |

(Continued)

OTHER PUBLICATIONS

Jariz, Grabbing Prominent Colors From an Image_vibrant.js, Jun. 3, 2015, https://www.cssscript.com/grabbing-prominent-colors-from-an-image-vibrant-js/ (Year: 2015).*

(Continued)

*Primary Examiner* — Nicholas Ulrich
(74) *Attorney, Agent, or Firm* — Intellectual Property Law Offices of Joel Voelzke, APC

(57) ABSTRACT

A website builder tool receives an image(s) selected or uploaded by a user, performs color analysis on that image(s) to identify prominent colors and most-occurring colors, and suggests one or more color palettes for use on the website such that text and other visual elements on the website will be aesthetically compatible with the user-provided image(s). Additionally, the server selects images from a database of stock images based on color compatibility with the user-provided image. The process can be performed in the CIELAB color space. Images can also be selected in part based on subject-matter tags. The user thus uploads an image(s) for placement on his website and optionally provides subject-matter descriptive tags, and the website builder tool responds by suggesting additional images and a color palette that will be compatible with the user-provided image, thus making the process of building an attractive and consistently themed website faster and easier.

20 Claims, 5 Drawing Sheets
(3 of 5 Drawing Sheet(s) Filed in Color)

(51) Int. Cl.
    *G06F 16/583*     (2019.01)
    *G06K 9/46*     (2006.01)

(56) References Cited

U.S. PATENT DOCUMENTS

| | | | | |
|---|---|---|---|---|
| 2013/0055116 | A1* | 2/2013 | Kern | G06F 17/218 |
| | | | | 715/762 |
| 2014/0240340 | A1* | 8/2014 | Shirasawa | H04N 1/6058 |
| | | | | 345/590 |
| 2014/0282009 | A1* | 9/2014 | Avrahami | G06F 3/04845 |
| | | | | 715/730 |
| 2015/0363380 | A1* | 12/2015 | McNaught | G06F 16/986 |
| | | | | 715/235 |
| 2015/0363503 | A1* | 12/2015 | Scheuerman | G06F 17/2235 |
| | | | | 715/202 |
| 2019/0065613 | A1* | 2/2019 | Bilsten | G06F 3/0482 |

OTHER PUBLICATIONS

Morse et al., Image-Based Color Schemes, 2007, ICIP 2007, IEEE (Year: 2007).*

\* cited by examiner

WEBSITE BUILDER IMAGE AND COLOR PALETTE SELECTOR

CROSS-REFERENCE TO RELATED APPLICATIONS

None.

BACKGROUND OF THE INVENTION

1. Field of the Invention

This invention relates to the field of website builders. More particularly, this invention relates to the field of a website builder having an image and color palette selector to assist users in quickly creating attractive and effective websites, and a graphical user interface (GUI) thereof.

2. Description of Related Art

Many website hosting companies now offer website builder products to their customers. A website builder is typically a set of software tools that allow a user to easily create and publish a website without knowing any software code such as HTML or CSS, and without having to purchase and learn how to use more sophisticated and complicated website design software. Website builders typically allow a user to choose from various website layout and functionality templates, and design websites using drag-and-drop processes and using a "what you see is what you get" (WYSIWYG) interface. Users can typically upload images, select color schemes, and input text quickly and easily. Website builders allow even novice users to design and publish simple websites within minutes, and to similarly update those websites quickly.

Some website builders include a database of stock photographs and other images from which a user can select, such as for use as background or foreground images on the website.

SUMMARY OF THE INVENTION

The present invention is of a software tool for incorporation into a website builder, that allows a user to input or otherwise select an image or images. The tool then analyzes the colors within the image using a number of criteria, and optionally analyzes any content tags that have been associated with that image, and then presents to the user a suggested color palette and/or suggested additional stock images for use on the website so as to produce a website that is aesthetically pleasing and consistent from a color standpoint and/or a content standpoint. For example, if a website will showcase a juicer/blender and the user uploads photographs of the juicer/blender producing carrot juice, the tool will analyze the photographs using a number of color-based criteria and any reference tags input by the user such as "juice" or "health food" or "wellness," "active lifestyle," and suggest appropriate background colors, font colors, and optionally additional stock images that are compatible with the theme of a juicer/blender and that particular photograph of a juicer/blender based on both color and content criteria.

The present invention therefore allows a user to upload or otherwise select at least one image for his website, and then the website builder will suggest compatible color palettes and other images for the website that the user is building. This streamlines and makes even easier and simpler the process of building an attractive and effective website.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1:
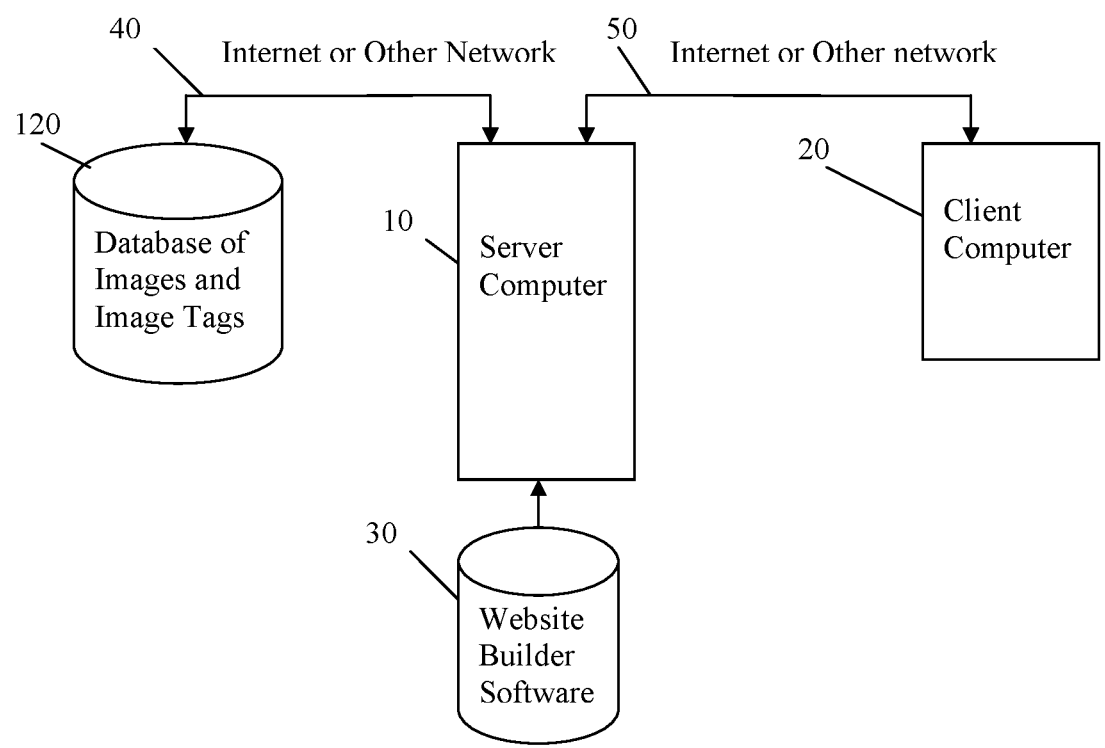
FIG. 1 is a system network diagram of an exemplary computer network on which the invention could be implemented.

FIG. 1 is a network diagram of an exemplary computer network on which the invention could be implemented. The network consists of one or more client computers 20 communicating across the Internet or other computer network 50 to one or more server computers 10. Server computer(s) 10 are also in communication across the Internet or other computer network 40 with an image database 120 containing a large number of images which are preferably either in the public domain or are properly licensed for use. Also available to server computer 10 is a memory storage device containing website builder software 30 which server computer 10 will run. The image database 120 could reside on any suitable hardware storage device including mass memory storage within the server computer 10 itself, or could reside within one or various separate storage devices such as RAID storage. The server computer(s) 10 could communicate with image database 120 via either the Internet or via a private network such as a local area network (LAN) such as an Ethernet connection.

Website builder software 30 could reside within the server computer's own memory, or in an external memory accessible over a computer network such as an Ethernet. Website builders typically allow a user to choose from various website layout and functionality templates, and design websites using drag-and-drop processes and using a "what you see is what you get" (WYSIWYG) interface. Users can typically upload images and drag and drop them into the desired locations on the website and resize them, drag and drop text boxes to add them to the website and type in the associated text, select color schemes, and add common functionality such as links, web contact fields, and search boxes.

Figure 2:
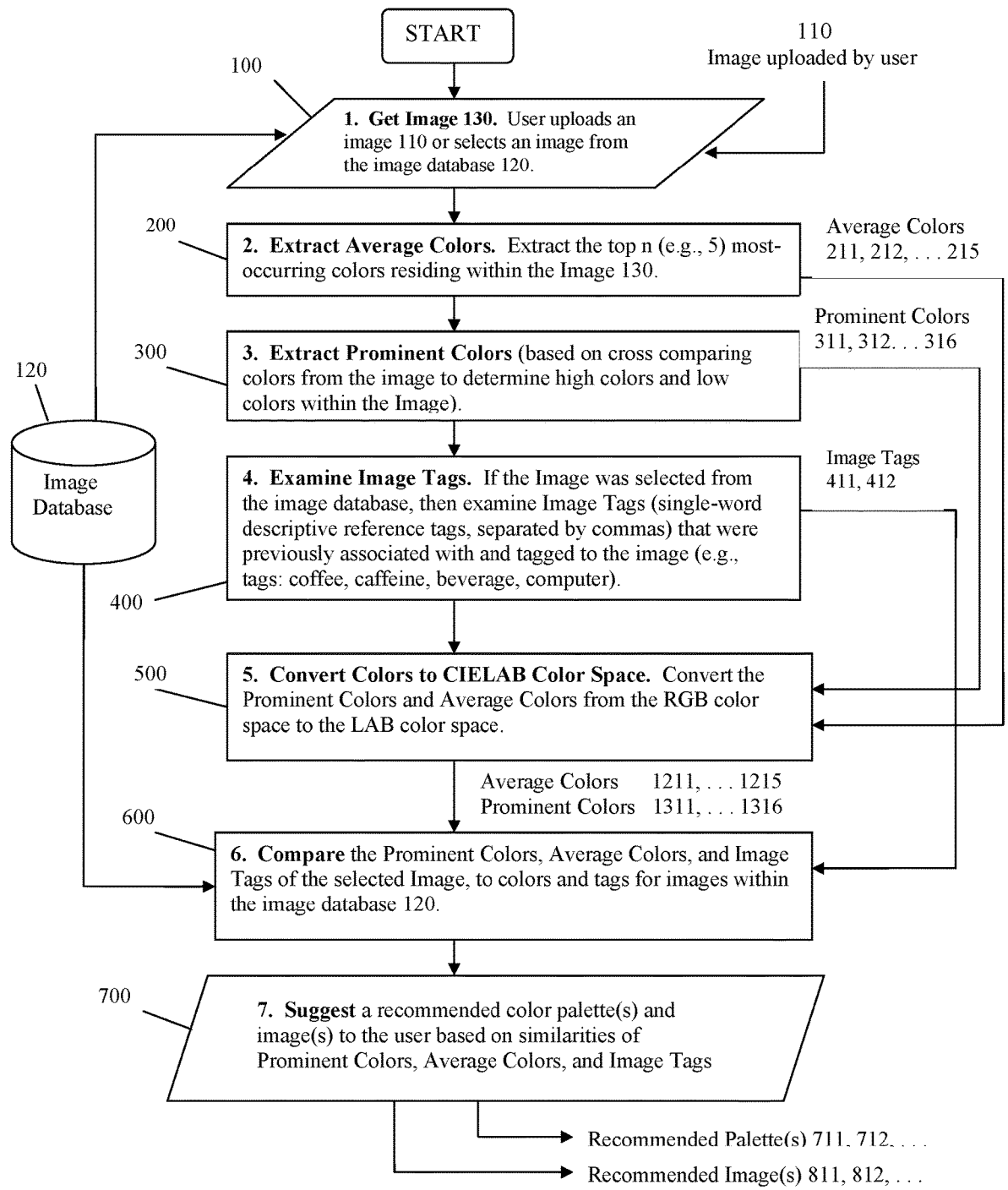
FIG. 2 is flow diagram illustrating an exemplary embodiment of the invention.

FIG. 2, is flow diagram illustrating an exemplary embodiment of the invention implemented on the network of FIG. 1. The steps in the flow diagram of FIG. 2 are discussed below.

1. Get Image 130.

In this embodiment an Internet user begins the process of the present invention at step 100 by uploading one or more images 110 to the server computer 10 on which the software which implements the invention resides. As an alternative, the user could select an image from a database 120 of stock images, such as a database of public domain images, or to which the website host has acquired a license for use by its hosted clients. The image database 120 could be resident on the server computer's mass storage such as a hard drive, or more likely would be stored in a separate memory accessible by the server computer 10 across either the Internet or an internal computer network. Whether the image is an image 110 uploaded by a user or is an image retrieved from image database 120, the user-selected image will be referred to as the "Image 130" or simply the "Image" for discussion purposes, constituting the image selection received by the server 10. Generally speaking, Image 130 can be a photograph, a hand-drawn image, a computer generated image (CGI), a company logo, or any other image.

If the user has uploaded a photograph as Image 130, the system prompts the user to add one or more descriptive image tags to the photograph. In this context, "tags" or "image tags" are single words or possibly short phrases that describe the subject matter of the photograph. For example, a user who uploads a photograph of a fruit and vegetable juicer for use on a website that will be used to promote and sell that juicer might input the following tags for association with the photograph: juice, fruits, vegetables, health, wellness, breakfast.

If the user has selected an image from the image database 120, the selected photograph, like all photographs within the database 120, preferably already has one or more tags associated and stored with it.

In the steps that follow, two particular color analysis techniques are used, namely, extracting the most commonly-occurring colors and extracting prominent colors. A number of different color analysis techniques could be used; the steps that follow represent merely one possible and illustrative embodiment.

2. Extract Average Colors.

At step 200, a first color analysis procedure is performed on image 110 preferably by the one or more server computers, namely, extracting the most-occurring colors, sometimes called the average colors. The top average colors are the n most frequently occurring colors within the image. In the illustrative embodiment, n=5. That is, the server computer identifies the 5 most commonly occurring colors within the Image. The result is 5 color values, which can be thought of as 5 color swatches. More specifically, the result is an array of 5 RGB hexadecimal ("Hex") color values, that is, an array of 5 Hex values in the RGB color space. The extraction of the 5-most frequently occurring colors within the image can be performed by the code that is contained in the software code appendix, Appendix 1, in the section entitled "2. Extract Average Colors."

Figure 3:
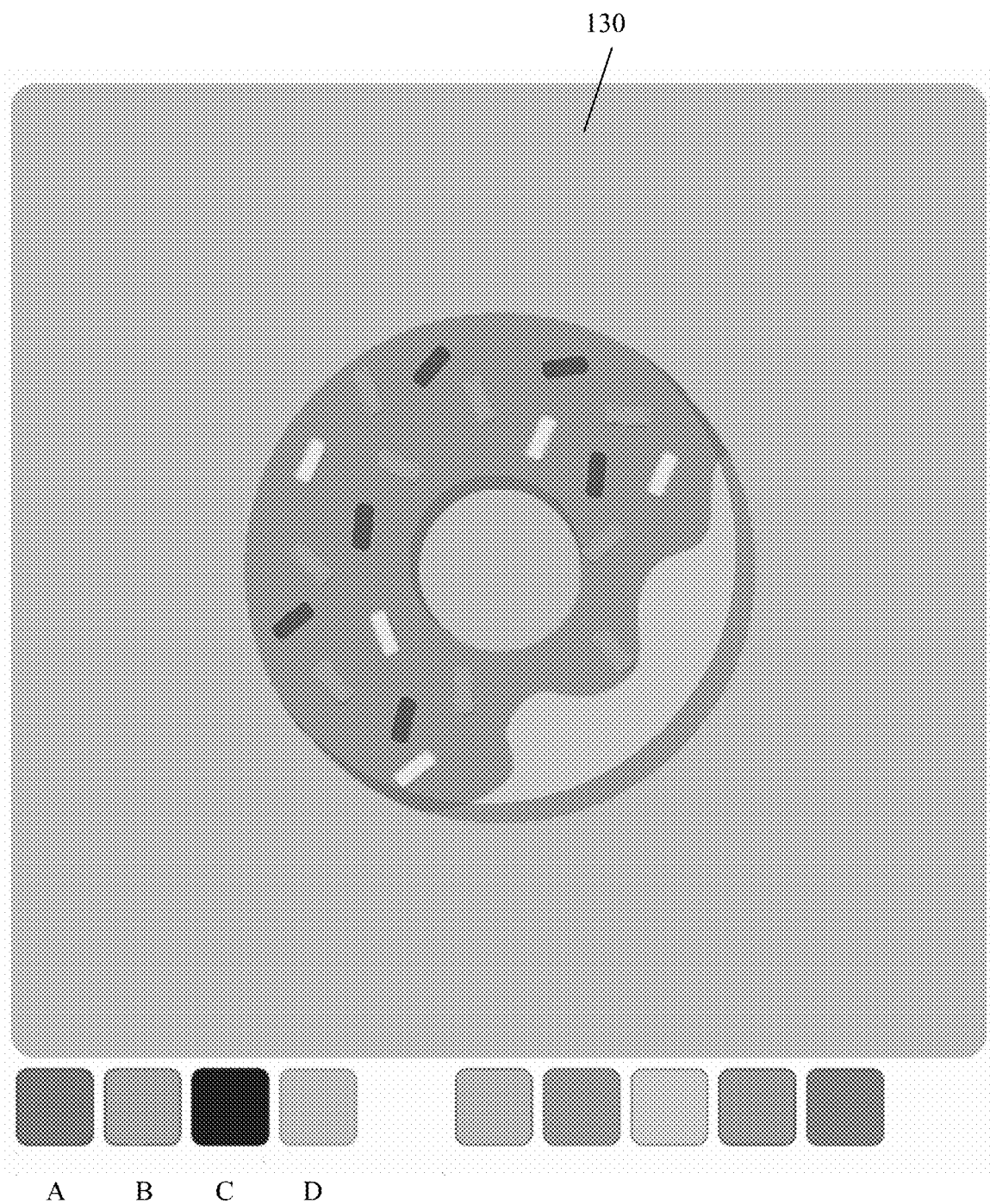
FIG. 3 illustrates a simple example of an image, and the prominent and most-occurring colors extracted from that image.

FIG. 3 illustrates a simple example of an Image 130 and the prominent and average colors extracted from the image. For extracting average colors, within the software code the nested "for" loops go through the image, pixel by pixel, first for one row and then the next row until it has gone through every pixel within the image, and stores the RGB value it finds at that pixel and adds it to an array. In this simple example there are 5 colors found within the image. For simplicity we will call those colors turquoise, pink, goldenrod, brown, and red. The RGB values for three of those colors found are:

turquoise 150, 227, 229
pink 247, 121, 192
goldenrod 233, 232, 44

The 5 colors found within the Image are shown in color swatches below the Image which are labeled as being the Average Colors. Those 5 colors are the most commonly occurring colors within the image. In this simple example, they are also the only colors found within the image.

In the flowchart of FIG. 1, the 5 average colors in the RGB color space are identified as colors 211-215.

3. Extract Prominent Colors.

At step 300, a second color analysis procedure is performed by one or more server computers on the Image, namely, extracting what are called the prominent colors.

In this embodiment the second color analysis procedure is the extraction of prominent/highlight/vibrant color(s) from the Image. Many color analysis techniques are known. One suitable routine that is publicly available for extracting prominent colors is the function vibrant.js. Vibrant.js is a JavaScript library that extracts prominent colors from an image and generates a color palette for further use, based on cross comparing all the colors within the image to determine the high and low colors from the image. The most recent version of vibrant.js generally returns the 6 following color values for a specified image:

Vibrant
Muted
DarkVibrant
DarkMuted
LightVibrant
LightMuted

Each of those returned values will be an RGB Hex number that represents that particular color parameter within the Image. Examples of images and the colors returned by vibrant.js for those 6 color parameters can currently be seen on the Internet at jariz.github.io/vibrant.js/. Those examples help to provide an intuitive feel for what those color parameters represent. The output can be thought of as 6 color swatches. In FIG. 3 there are 4 colors labeled as Prominent Colors. These are the prominent colors found within the Image of FIG. 3. Not all of the 6 color parameters returned by vibrant.js need be used in the method of the present invention. A subset of those 6 color parameters could be used. For example, the method could use at least 3 of those parameters.

In the flowchart of FIG. 2, the 6 prominent colors in the RGB color space are identified as colors 311-316.

In the vibrant.js routine the number of colors within the initial palette from which the resulting swatches will be generated, defaults to 64. That default value can be changed by an argument in the function call.

At this point, we have identified the n-most commonly occurring colors plus the prominent colors. We will presume for this example that n=5 and that there are 6 prominent colors identified by the color analysis, for a total of 11 colors. Of course, the actual numbers could be different depending on the actual color analysis technique used, and the desired settings and the actual number of colors extracted from Image 130.

4. Input or Examine Image Tag(s); Identify Similar Words

Next, and optionally, at step 400 image tags are input or examined, and possible synonyms and other words having similar meanings or associations are identified by the at least one server computer. For example, if the user has inputted an Image of a person exercising at a gym, he might input an image tag of "exercise." The server computer might identify "working out" as a synonym, and identify "sports," "yoga," "running" and "stretching," and "lifting weights" as having similar meanings or associations. Similarly, if the user selected an Image from the image database 120, the Image could already have associated with it the image tag of "exercise," and once again the server computer could identify possible synonyms and other words having similar meanings or associations. Alternatively, those synonyms and similar words could have also been pre-stored in association with the Image. These tags are subject matter tags because they describe the subject matter of the image. For simplicity, they will generally be referred to in the following discussion as simply "image tags."

The steps of extracting average colors (200), extracting prominent colors (300), and obtaining image tags and identify similar words (400), could be performed in different orders than the one described.

5. Convert to CIELAB Color Space.

Next at step 500, the server computer optionally converts the 11 colors 211-215 and 311-316 that were extracted as the prominent and average colors from the Image in the RGB color space, and converts those colors from the RGB color space to the XYZ color space as an intermediate result, and then to the CIELAB color space.

The term "color space," sometimes called a "color model" or "color system," is an abstract mathematical model which simply describes the range of colors as tuples of numbers, typically as 3 or 4 values or color components, such as Red, Green, and Blue (RGB). Color space can be thought of as an elaboration of the coordinate system and sub-space. Each color in the system is represented by a single dot. In the RGB color space, generally speaking, the "R" value represents an intensity of red light, the "G" value represents an intensity of green light, and the "B" value represents an intensity of blue light, in the color. The most common color space used for visual displays is the RGB color space including variations on the basic RGB color space. However, several different color spaces have been constructed and used depending on the application, including the RGB, CMYK, and CIELAB color spaces, and variants thereon.

The inventor has observed including through actual test results that because the CIELAB color space complements what the human eye can see and compare, comparing colors within the CIELAB color space produces superior results as judged by the human eye as compared to performing the color comparison in the RGB color space.

The CIELAB color space, also called the CIEL*a*b* color space, describes mathematically all perceivable colors in the three dimensions:

L* for lightness a* for green-red b* for blue-yellow, which is the color opponent of green-red.

The CIELAB color space exceeds the gamuts of the RGB and CMYK color models (for example, ProPhoto RGB includes about 90% of all perceivable colors). One of the most important attributes of the CIELAB model is device independence. This means that the colors are defined independent of their nature of creation or the device they are displayed on. The CIELAB color space is used when graphics for print have to be converted from RGB to CMYK, as the CIELAB gamut includes both the RGB and CMYK gamut. Also it is used as an interchange format between different devices as for its device independency. The space itself is a three-dimensional real number space that contains an infinite number of possible representations of colors. However, in practice, the space is usually mapped onto a three-dimensional integer space for device-independent digital representation, and for these reasons, the L*, a*, and b* values are usually absolute, with a pre-defined range. The lightness, L*, represents the darkest black at L*=0, and the brightest white at L*=100. The color channels, a* and b*, will represent true neutral gray values at a*=0 and b*=0. The red/green opponent colors are represented along the a* axis, with green at negative a* values and red at positive a* values. The yellow/blue opponent colors are represented along the b* axis, with blue at negative b* values and yellow at positive b* values. The scaling and limits of the a* and b* axes will depend on the specific implementation of CIELAB color, as described below, but they often run in the range of ±100 or −128 to +127 (signed 8-bit integer).

In the flowchart of FIG. 2, the 6 prominent colors in the CIELAB color space are identified as colors 1211-1216, and the 5 average colors in the CIELAB color space are identified as colors 1311-1315.

6. Compare Colors and Tags to Those of Images in the Database.

Now that the 6 prominent colors and 5 average colors in the CIELAB color space for the user-selected Image 130 have been either retrieved from memory (in the case of an image selected by the user from the database) or have been calculated (in the case of an image uploaded to the server computer by the user), and optionally suitable image tags have been identified if used, the next step is to identify color palette(s) and image(s) from the image database 120 that will be aesthetically compatible, and preferably also subject-matter compatible, with the user-selected Image.

Preferably for database 120 of stock images the prominent colors and average colors will have already been extracted and stored within the database in association with the respective images. To say that the prominent colors and average colors have been "stored" means that they are stored in a data field that is separate from the image itself. Thus, if the Image is one that has been selected from the database, these color analysis steps do not need to be performed in real time on the Image. Rather, the stored prominent and average colors for those images are simply retrieved from the database along with the Image. Alternatively, if the images within image database 120 do not already have stored within the database their prominent and average colors, those prominent and average colors associated with each image could have been pre-computed and pre-stored within the memory of server computer 10 together with respective identifiers identifying the images to which they below. In that way, server computer 10 can identify by color content the candidate images to be retrieved using the stored color information, and then retrieve from image database 120, or present to the user simply by framing, only the candidate images that have already been identified as having similar colors.

In this context, a "color palette" is a set or plurality of colors. Typically the colors within a color palette will have been selected for aesthetic compatibility with one another, although various criteria could have been used by either a human or a computer algorithm for selecting the colors within a color palette. The colors within a palette are presented to a user via patches of color on the screen which are called "color swatches" or simply "swatches." The color palettes may be color palettes that have been predefined by others, such as the color palettes that can currently be seen on the Internet at www.colourlovers.com/palettes, or they may be custom created. The color palettes may be modified as certain colors and color schemes come into, or go out of, fashion and favor, particularly with respect to rendering graphics and/or text for websites.

The Image 130 may have been selected from an image database 120 containing a first plurality of images. In the most general terms, the colors and tags (if present) of Image 130 are compared to the colors and tags (if present) of images from a second plurality of images, and image(s) from that second plurality of images are selected for suggestion to the user for possible inclusion within his website. The second plurality of images may be the same as the images in the first plurality of images but not including the selected Image 130. In other words, image database 120 is searched for compatible images not including the actual Image 130 itself.

The images to suggest to the user may be automatically selected using various algorithms. In the illustrative embodiment they are selected on the basis of least total cumulative color distance (numerical Δ) of their prominent and most-occurring colors, from the prominent and most-occurring colors within Image 130. The image(s) selected by server 10 to be suggested to the user define computer-selected image(s).

Similarly, the color palettes to suggest to the user may be selected using various algorithms. In the illustrative example they are selected on the basis of least total cumulative distance (numerical Δ) from their constituent colors to the prominent and most-occurring colors within Image 130. The color palette selected by the server 10 to be suggested to the user define a computer-selected color palettes. The colors within the computer-selected color palette define computer-selected colors. Swatches of such colors to be presented to the user define computer-selected color swatches.

7. Suggest a Recommended Color Palette(s) and Image(s)

The image(s) and color palette(s) that server computer 10 has automatically identified are now presented to the user via the GUI for possible inclusion of the image(s) within his website, and for possible use in rendering text and other graphical elements. The user may select images by clicking on them with a mouse or other device, or the user may drag and drop them into his website. The user may select color palettes by selecting them with a mouse, or may select individual colors such as for use in rendering particular text or particular graphical elements on an element-by-element basis by clicking on them with a mouse.

Figure 4:
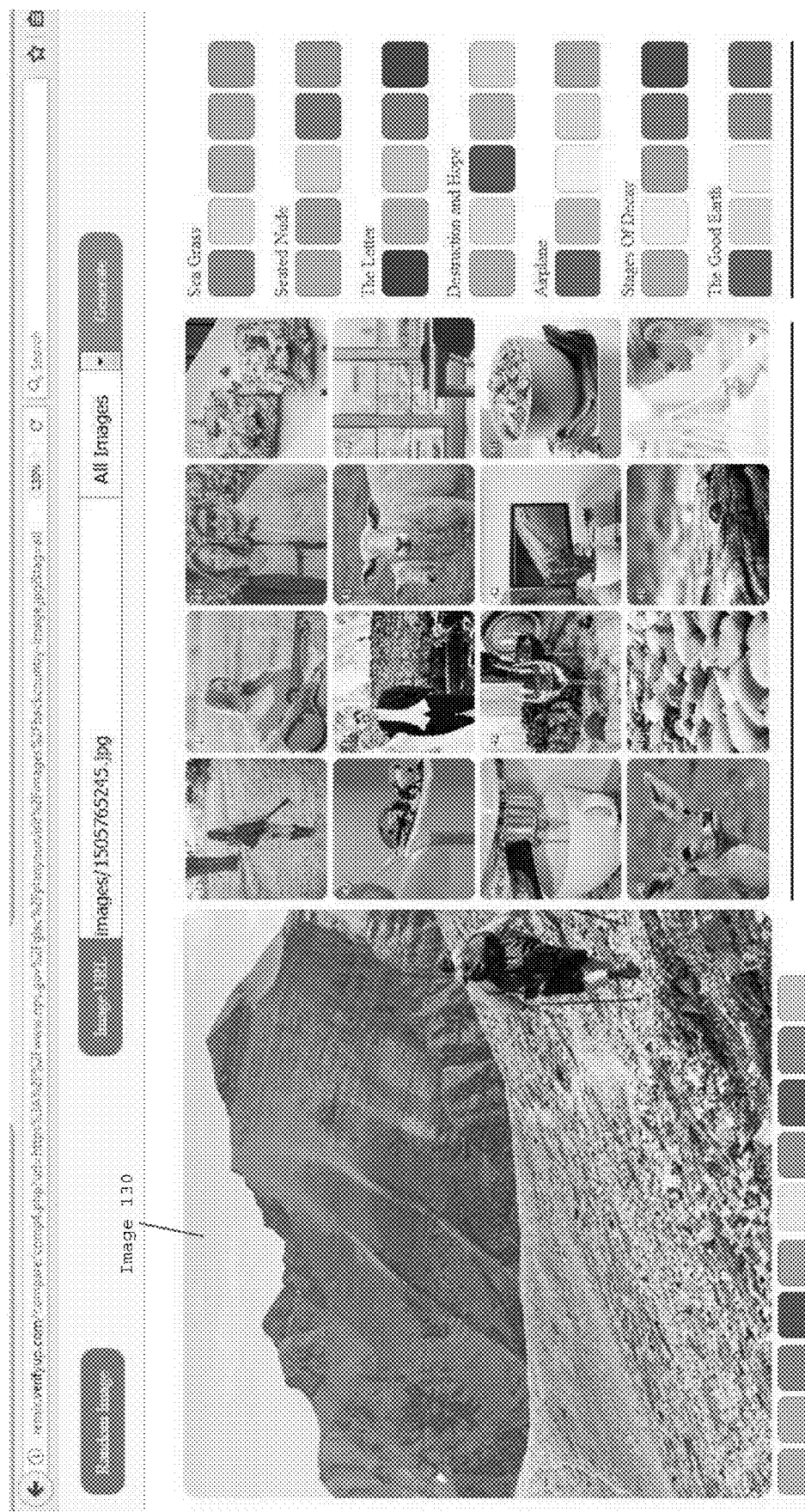
FIG. 4 is an example screen shot of a user-provided image, together with the system outputs of vibrant color swatches, most-occurring color swatches, similarly colored images from an image database, and suggested color palettes.

FIG. 4 is an example of an Image 130 that was uploaded or selected by a user, together with the prominent colors and most-occurring colors that were extracted from that image, and further with suggested color-compatible or similarly colored images and suggested color palettes. The prominent colors 311, 312, . . . , presented as color swatches, are presented underneath Image 130 on the left hand side, and the most-occurring colors 211, 212, . . . , presented as color swatches, are presented underneath Image 130 on the right hand side. The similarly colored images 811, 812, . . . from the image database 120 are presented in the middle of the figure. The suggested color palettes 711, 712, . . . are presented on the right hand side of the figure.

Of the computer-suggested color palettes 711, 712, . . . at the top of the page, the one named "Sea Grass," has the smallest least total numerical Δ from the prominent and most-occurring colors. The next suggested color palette underneath the "Sea Grass" color palette, named "Seated Nude," represents the next smallest total numerical Δ.

Figure 5:
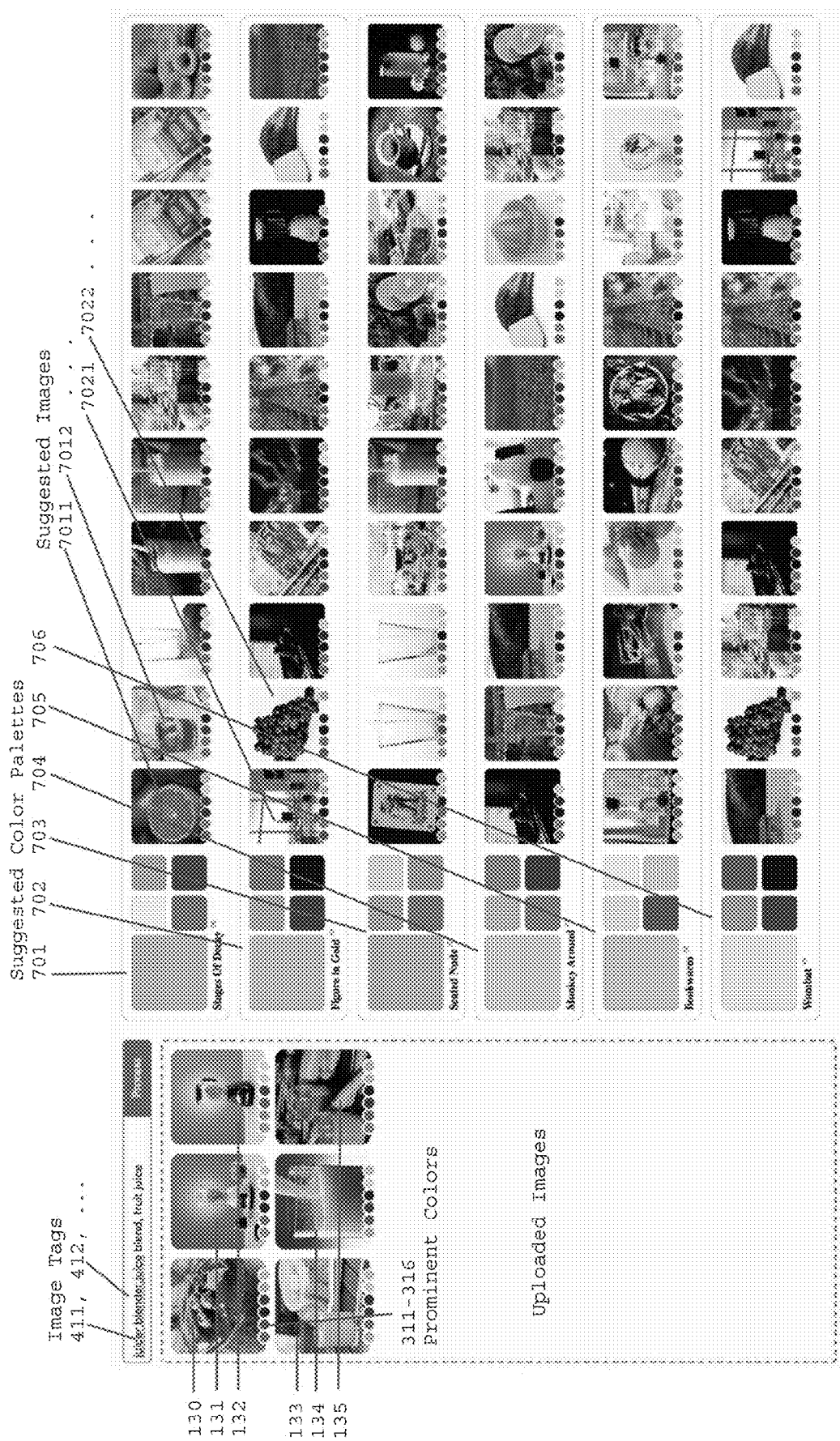
FIG. 5 is an example screen shot of several user-provided images and user-provided descriptive tags, together with the system outputs of vibrant color swatches, suggested color palettes, and images suggested by the system in response to the input image colors and the descriptive tags.

FIG. 5 is a computer screen shot showing a more complete illustrative example. In this case the website will be a website that promotes and sells a blender which is seen in images 130, 131. The user has input a total of six images 130, 131, 132, 133, 134, and 135 that he wishes to use on the website. Additionally, the user has provided a plurality of descriptive tags 411, 412, . . . . In this case the tags are "juicer, blender, juice, blend, fruit juice." Alternatively, the user can input tags that are more forward-looking, that is, they are directed to the images that he would like the system to retrieve, such as "vegetables," "breakfast," "health," "fitness," and "exercise."

In this case the system has responded with suggested color palettes 701, 702, 703, 704, 705, and 706, presented as respective groups of color swatches, and suggested images that are compatible with those color palettes. Associated with color palette 701, the system has suggested images 7011, 7012, etc. Associated with color palette 702, the system has suggested images 7021, 7022, etc. The suggested images may be: free images that are available from the image supplier without charge for limited purposes, images that are available for use upon payment of a license fee; images that are available on different terms; or a combination of such images. The website www.pixabay.com, for example, provides completely free images, as well as sponsored images that free to use for only limited use but upon payment of a licensing fee can be used in additional ways.

The computer-selected color palettes including their individual colors are presented to the user via color swatches for his selection. Additional images within each color palette can be displayed by the user selecting a "Next" button (not shown) within each palette. Additionally, additional color palettes can be displayed by the user pressing a "Next" button (not shown) for the palettes.

The user can now select one of the suggested color palettes, such as color palette 701 which is called "Stages of Decay." If the user selects Stages of Decay then additional images compatible with the Stages of Decay color palette and with the image tags provided by the user will appear. The user can then select images for use on his website from among the selected images. The selection can be performed by dragging and dropping the images into the website that he is building.

Alternatively, the user can simply select his images from among all the suggested images 7011, 7012, . . . 7021, 7222, . . . presented without first selecting a color palette.

The user can also select from among some images presented, and then go back and enter different tags to retrieve additional but different stock images. In our example of the juicer of FIG. 5, the user can select a first set of images such as images of fruits, vegetables, and juice in a glass. The user can then go back and enter tags such as "health, exercise, yoga" in the tag field whereupon the system will then suggest images of people exercising, practicing yoga, and other health-related images that are aesthetically compatible with the user's selected Images or his selected color palette. The user can then select from among those additional images for inclusion within his website. The user can also search within all images within the database without regard to colors within the image, in order to give the user the ability to search for and select any image within the database for inclusion on his website.

The color palette suggested by the system and selected by the user also helps in selecting colors for use in rendering text and other graphic elements on the website such as background colors, borders, dividers, logos, tabs, etc. When the user has elected to add a text box and text to his nascent website, the system can provide to the user not only the option of rendering text in black such as against a light background, or in white such as against a dark background, but can suggest via swatches on the screen colors from within the color palette to use in rendering the text and/or other graphical elements. If the text will be placed over an image, the system can automatically select as a default a color from the user-selected color palette that will provide high contrast for readability against the portions of the image over which the text will appear, as well as be color-compatible with the rest of the website. The resulting website as rendered by server computer 10 can include the user's selected Image(s), plus text and/or graphical elements rendered using 1, 2, or more colors from a computer-selected and user-approved color palette.

When combined with existing website builder products having easy to use WYSIWYG interfaces, the system and method of the present invention provides an improved graphical user interface that allows users to quickly build attractive, aesthetically pleasing, color-consistent websites that are built around one or more user-provided images. The user does not need to possess any prior training in art, graphic design, color perception, or related fields, as the system provides to the user a manageably small number of aesthetically consistent color options that are easy for a user to navigate and select from among. Additionally, the system assists a user in selecting images for inclusion within his website from a database of what might be thousands or even hundreds of thousands of stock images, by presenting to the user a small subset of those stock images which the user is most likely to ultimately select.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, the number of prominent and most-occurring colors extracted by the system for use in color comparisons could vary, or the system could use only prominent colors or only most-occurring colors. The number of total available defined colors that the system uses could vary. The color spaces used could vary. The construction and arrangement of the graphical user interface could vary. Accordingly, it is to be understood that the detailed description and the accompanying drawings as set forth hereinabove are not intended to limit the breadth of the present invention, which should be inferred only from the following claims and their appropriately construed legal equivalents.

I claim:

1. A method, comprising:
receiving from an Internet user, by at least one server computer communicatively coupled to a network, an image selection, said image selection comprising at least one of an image uploaded to the server computer across said network and a selection of an image from a first plurality of images stored on said network, said image selection defining a selected image;
extracting, by said at least one server computer performing color analysis on said selected image, at least one prominent color from said selected image, said extracting comprising cross comparing colors from the image to determine high and low colors within the image;
extracting, by said at least one server computer performing color analysis on said selected image, a plurality of most-occurring colors within said selected image;
based on said at least one prominent color and said plurality of most-occurring colors, identifying, by said at least one server computer, a color palette, said color palette defining a suggested color palette;
presenting to said Internet user, by said at least one server computer, a plurality of suggested palette colors corresponding to said suggested color palette;
presenting to said Internet user, by said at least one server computer, an option for the user to select said suggested palette colors; and
if the user selects said suggested palette colors, then using at least one of said suggested palette colors for rendering at least one of text and graphics on a website.

2. The method of claim 1, further comprising:
comparing, by said at least one server computer, said at least one prominent color and said plurality of most-occurring colors, to colors within an image from a second plurality of images stored on said network;
based on said comparison, automatically selecting, by said at least one server computer, an image from among said second plurality of images, said image defining an automatically selected image;
presenting to said Internet user, by said at least one server computer, said automatically selected image; and
presenting to said Internet user, by said at least one server computer, an option for the user to add said automatically selected image to said website.

3. The method of claim 2, wherein:
said selected image is digitally represented within a first color space;
said extracting of the at least one prominent color and the most-occurring colors occurs within said first color space such that said at least one prominent color and said most-occurring colors are digitally represented in said first color space;
converting, by said at least one server computer, the at least one prominent color and said most-occurring colors into a second color space; and
performing in the second color space said step of comparing the at least one prominent color and the most-occurring colors of the selected image to colors within an image from a second plurality of images stored on said network.

4. The method of claim 3, wherein the second color space is the CIELAB color space.

5. The method of claim 3, wherein:
the first color space is the RGB color space; and
the second color space is the CIELAB color space.

6. The method of claim 2, wherein for said second plurality of images stored on said network, each of those images has stored associated therewith at least one prominent color and a plurality of most-occurring colors.

7. The method of claim 2, wherein:
images within the second plurality of images have stored and associated therewith subject matter tags describing subject matters of respective images; and
said automatically selecting step is based on both said comparing step and a comparing of said subject matter tags with at least one subject matter tag associated with the selected image.

8. The method of claim 7, wherein:
said selected image is an image that had been uploaded by the user; and
the method further comprises prompting the user to input said at least one subject matter tag associated with the selected image.

9. The method of claim 1, wherein:
said extracting the at least one prominent color is performed by a means for cross comparing colors from the image to determine high and low colors within the image;
said extracting the most-occurring colors is performed by a means for extracting said most-occurring colors within said selected image.

10. The method of claim 1, wherein:
said extracting from said selected image at least one prominent color comprises extracting, by said at least one server, at least three of Vibrant, Muted, and DarkVibrant, DarkMuted, LightVibrant, and LightMuted colors from said selected image.

11. A method of assisting an Internet user in building a website, by at least one server computer communicatively coupled to a network, comprising:
receiving from the Internet user, by said at least one server computer, an image selection, said image selection comprising at least one of an image uploaded to the server computer across said network and a selection of an image from a first plurality of images stored on said network, said image selection defining a selected image;
performing, by said at least one server computer, a color analysis on said selected image;
based at least in part on said color analysis, presenting, by said at least one server computer, at least one stock image to the Internet user for possible selection by said Internet user;
if the Internet user selects said stock image, then constructing, by said at least one server computer, said website, said website including both said selected image and said stock image on the website.

12. The method of claim 11, wherein said color analysis is performed by a means for performing said color analysis.

13. The method of claim 11, wherein:
said color analysis produces a plurality of most-occurring colors within said selected image; and
said server computer selects said stock image from a computer database of stock images based at least in part on a comparison, made by said at least one server computer, of said most-occurring colors within said selected image to most-occurring colors respectively occurring in said stock images within said computer database.

14. A method of assisting an Internet user in building a website, by at least one server computer communicatively coupled to a network, comprising:
receiving, by said at least one server computer, a user-selected image for use on a website;
analyzing, by said at least one server computer, colors within said user-selected image;
based at least in part on said color analyzing step, selecting, by said at least one server computer, an image from an image database and a plurality of color swatches, said selected image defining a computer-selected image and said color swatches defining computer-selected color swatches;
presenting to said Internet user, by said at least one server computer, said computer-selected image for possible inclusion on said website;
presenting to said Internet user, by said at least one server computer, said computer-selected color swatches for possible use on said website;
if said Internet user selects said at least one image, then assembling, by said at least one server computer, a website that contains both said user-selected image and said computer-selected image; and
if said Internet user selects said computer-selected color swatches, using at least one color from said computer-selected color swatches for rendering, by said at least one server computer, content on said website.

15. The method of 14, further comprising:
storing in respective association with each image within said image database, a plurality of colors that were respectively extracted from each image using a color analysis algorithm, said colors defining stored colors and being stored separate from the image itself;
selecting, by said at least one server computer, said computer-selected image based at least in part on a comparison of said stored colors to colors within said user-selected image as determined by said color analyzing step.

16. The method of claim 14, where the step of using at least one color from said computer-selected color swatches for rendering content on said website, comprises using at least two colors from said computer-selected color swatches for rendering content on said web site.

17. The method of claim 14, wherein:
said step of analyzing colors produces intermediate output colors in a first color space;
said intermediate output colors are translated, using said at least one server computer, into a second color space; and
said color swatches are selected, by said at least one computer server, based on color representations of those color swatches in said second color space.

18. The method of claim 17, wherein said second color space is the CIELAB color space.

19. A method of assisting an Internet user in building a website, by at least one server computer communicatively coupled to a network, comprising:
receiving from the Internet user, by said at least one server computer, an image selection, said image selection comprising at least one of an image uploaded to the server computer across said network and a selection of an image from a first plurality of images stored on said network, said image selection defining a user-selected image;
performing, by said at least one server computer, a color analysis on said user-selected image;
based at least in part on said color analysis, automatically selecting a second image from a database of images, said second image defining a computer-selected image;
presenting, by said at least one server computer, said computer-selected image to the Internet user for possible selection by said Internet user; and if the Internet user selects said computer-selected image, then constructing, by said at least one server computer, said website, said website including both said user-selected image and said computer-selected image on the website.

20. The method of claim 19, further comprising:

based at least in part on said color analysis, presenting, by said at least one server computer, for selection by said Internet user a plurality of color swatches;

receiving, by said at least one server computer, a color selection from among said plurality of color swatches; and using said color selection to render on said website, by said at least one server computer, at least one of text and graphics.

* * * * *